United States Patent Office 3,176,528
Patented Apr. 6, 1965

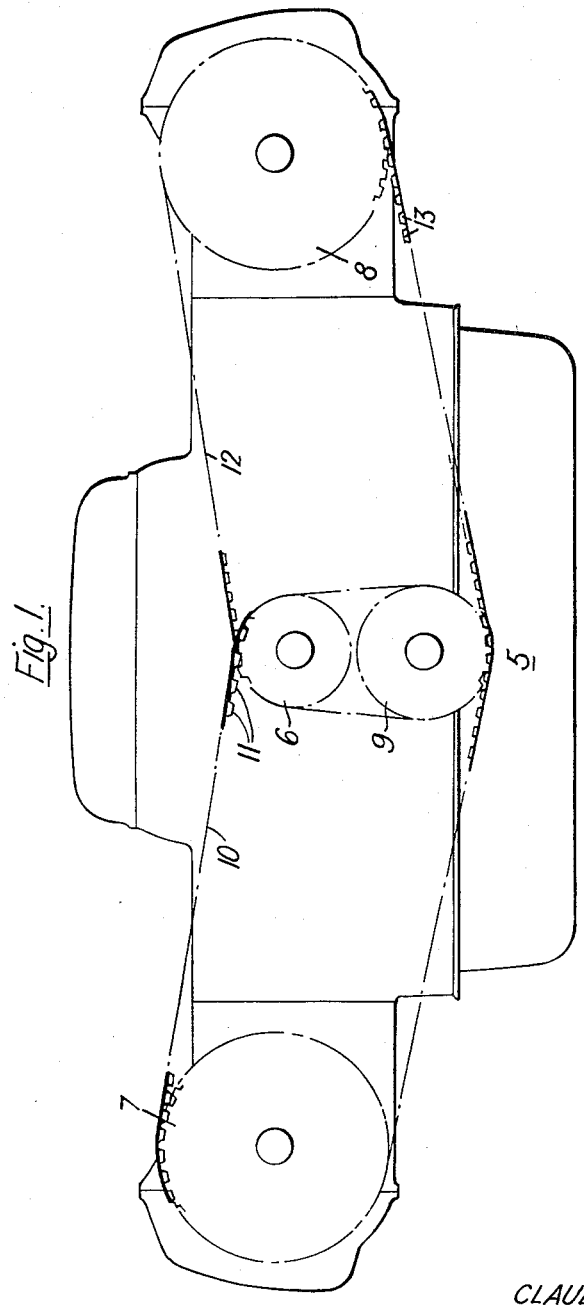

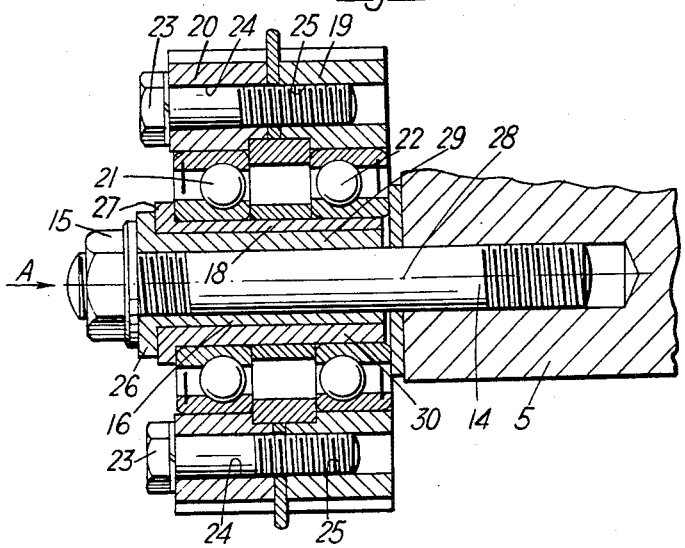
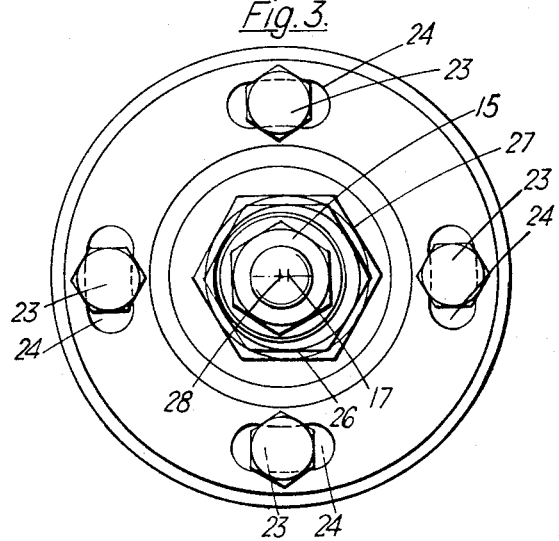

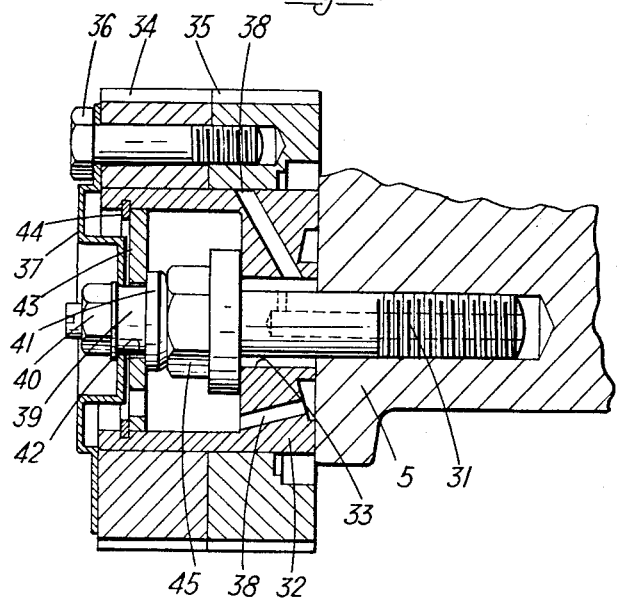

3,176,528
DUAL DRIVES USING ENDLESS FLEXIBLE INEX-
TENSIBLE DRIVE-TRANSMITTING MEMBERS
Claude Hill, Kenilworth, England, assignor to Harry
Ferguson Research Limited, Stow-on-the-Wold, England, a British company
Filed Apr. 9, 1963, Ser. No. 271,734
Claims priority, application Great Britain, Apr. 18, 1962,
14,731/62
8 Claims. (Cl. 74—226)

This invention relates to dual drives using endless flexible inextensible drive-transmitting members.

An example of such dual drives is found in internal combustion engines of the opposed cylinder type in which cam-shafts at opposite sides of the crankcase are driven from the crankshaft by toothed belt-and-pulley gearing.

In any such drive it is necessary to ensure adequate tautness of the inextensible, internally toothed belts of the two drives, and to achieve this it has been proposed to train the belts round coaxial but adjustable idler or jockey pulleys. It is found however that such an adjustment, though it tightens both belts equally, tends to bring the belt teeth out of precise register with the pulley teeth.

It is an object of this invention to obviate or mitigate this disadvantage.

The invention is an idler assembly for a dual drive, the assembly including mounting means for mounting the assembly on a stationary support, a pair of side-by-side co-axial pulleys rotatably carried by said mounting means, means for adjusting said pulleys as a unit relative to said mounting means, and means for angularly adjusting said pulleys relative to one another about their common axis.

Preferably the means for adjusting said pulleys as a unit relative to said mounting means includes at least two eccentric sleeves mounted on said mounting means and carrying said pulleys.

Alternatively the means for adjusting said pulleys as a unit relative to said mounting means may include a boss associated with said mounting means and moveable relative thereto, said pulleys being rotatably mounted on said boss.

Embodiments of the invention will now be described by way of example with reference to the accompanying drawings in which:

FIG. 1 is diagrammatic elevation of a dual drive;

FIG. 2 is an axial section of an idler assembly according to the invention;

FIG. 3 is a view of the complete assembly taken in the direction of the arrow A in FIG. 2; and FIG. 4 is a view similar to FIG. 2 showing a modification.

Referring to the drawings, the dual drive shown in FIG. 1 is mounted on an engine crankcase 5 and includes a double driving sprocket 6 on the engine crankshaft, two driven sprockets 7 and 8 on camshafts at opposite sides of the engine, and an adjustable idler assembly 9 mounted on the crankcase 5 below the driving sprocket 6. An endless inextensible flexible belt 10, having internal teeth 11 is trained round the driving sprocket 6, idler assembly 9 and driven sprocket 7, and a further similar belt 12 having internal teeth 13 is trained round the driving sprocket 6, idler assembly 9 and the other driven sprocket 8, the belts 10 and 12 being displaced axially of one another so as to lie side by side on the driving sprocket 6 and the idler assembly 9.

As shown in FIGS. 2 and 3 the idler assembly 9 is secured to the crankcase 5 by a mounting shaft or pin 14 and clamp nut 15. An eccentric sleeve 16 is mounted on the pin 14 so as to be free to rotate thereon, and a second eccentric sleeve 18 is mounted on the first sleeve 16. This sleeve 18 carries a pair of side by side co-axial toothed pulleys 19 and 20 which are free to rotate about the sleeve 18 on bearings 21 and 22, but which are clamped together as a unit by screws 23. These screws are arranged arcuately around the pulleys and pass through arcuate slots 24 in the outer pulley 18 into screwed apertures 25 in the inner pulleys 19. The sleeves 16 and 18 are provided with hexagons 26 and 27 respectively at their outer ends to facilitate rotation.

In order to adjust the tensions of the belts 10 and 12, the clamp nut 15 and the screws 23 are slackened, and one of the sleeves 16, 18 is rotated relative to the other by means of a spanner applied to the hexagon 26 or 27. Rotation of the hexagon 26 relative to the hexagon 27 in a clockwise direction as shown in FIG. 3 effects downward movement of the entire assembly relative to the fixed axis 28, and rotation of the hexagon 26 in the anticlockwise direction effects upward movement. Maximum movement of the assembly in any direction is achieved by rotating the hexagons 26 and 27 one after the other in opposite directions till the points of maximum eccentricity of the sleeves 16 and 18 lie co-linearly with the fixed axis 28 and on the same side thereof.

When the sleeve 16 and 18 have been so adjusted, the clamp nut 15 is tightened to hold them firmly in their adjusted positions. While the above adjustment is being carried out, the pulleys 19 and 20 are automatically rotated relatively to one another by the pressure of the belts entrained around them, the relative rotation being permitted since the screws 23 are slackened. Once the clamp nut 15 has been tightened therefore, the screws 23 are also tightened to clamp the pulleys 19 and 20 firmly together each pulley being in correct register with the teeth of the belt trained round it.

In the embodiment shown in FIG. 4 a mounting shaft or pin 31 is screwed into the crankcase 5 and secures a bearing boss 32 to the crankcase. The boss 32 has a central hole 33 which is larger in diameter than the pin 31. Pulleys 34, 35 are rotatably mounted on the boss 32 and are secured together as in the previous embodiment by screws 36.

An oil-tight cover 37 is secured by the screws 36 to the outer pulley 34 and oil conduits 38 are led through the boss 32 to supply lubricating oil to the moving parts, oil being supplied from the engine lubricating system.

A central fitting 39 is secured by a nut 40 to the cover 37 and includes an internal head 41. The fitting 39 passes through a hole 42 in a disc 43 fitted into the cylindrical interior of the boss 32 and retained therein by a spring ring 44. In this way the parts 39 to 44 locate the pulleys 34, 35 on the boss 32 but permit a limited amount of axial movement determined by the space between the hexagonal head 45 of the pin 31 and the head 41, this distance being adjustable by means of the nut 40.

In operation of this embodiment the pin 31 and screws 36 are slackened and the boss 32 can thus be moved relatively to the pin 31 in any desired direction till both the belts trained round the pulleys 34 and 35 are at the desired tension. The pin 31 is then tightened by means of the hexagon 45 to clamp the boss 32 in its adjusted position firmly against the crankcase 5. As in the previous embodiment the pulleys 34, 35 are automatically turned relatively to one another by the pressure of their respective belts, and they are secured in this relative position by tightening the screws 36. In this position each pulley is in accurate register with the teeth of the belt trained round it.

It should be noted that in each of the embodiments shown the centre of the assembly may be adjusted to occupy any position within the area of the circle described by the full eccentricity of the adjustment. In the embodiment shown in FIGS. 1 to 3 this is achieved by the use of two eccentric sleeves and in the embodiment shown in FIGS. 1 and 4 the boss 32 can be moved freely about the pin 31 to an extent limited by the diameter of the hole 33.

By virtue of this arrangement adjustment can be made to allow for slight differences in the lengths of the belts 10 and 12 and in the distances of the centres of the camshafts from the crankshaft centre due to manufacturing tolerances.

An example of a toothed belt suitable for use in a duel drive such as that described is composed of a flexible material such as rubber or nylon rendered inextensible by an endless metal wire embedded in it.

In a modification of the invention more than two eccentric sleeves may be used.

I claim:

1. An idler assembly for a dual drive, the assembly including a stationary shaft, a pair of side-by-side coaxial pulleys rotatably carried by said stationary shaft, means for displacing the effective axis of rotation of said pulleys relative to said stationary shaft into any position within a predetermined area around said shaft, and means for angularly adjusting said pulleys relative to one another about their axis of rotation.

2. An idler assembly as claimed in claim 1 in which the means for displacing the effective axis of rotation of said pulleys includes at least two eccentric sleeves mounted on said shaft and carrying said pulleys.

3. An idler assembly as claimed in claim 2 including nuts on said sleeves to assist in adjustment thereof, and including clamp means for locking said sleeves in any adjusted position.

4. An idler assembly as claimed in claim 1 in which said means for displacing the effective axis of rotation of said pulleys includes an apertured boss, said pulleys being rotatably mounted on said boss, and said boss being mounted about said shaft and moveable relative thereto to displace the effective axis of rotation of said pulleys into any position within the area of the aperture.

5. An idler assembly as claimed in claim 4 including adjustable stop means associated with said shaft and with said boss to permit limited axial movement of said pulleys.

6. An idler assembly as claimed in claim 1 in which said means for angularly adjusting said pulleys relative to one another includes at least one screw associated with slot means in one of said pulleys and engageable in a threaded aperture in the other of said pulleys.

7. A dual drive including an idler assembly as claimed in claim 1.

8. An internal combustion engine including a dual drive as claimed in claim 7.

References Cited by the Examiner
UNITED STATES PATENTS

| | | | |
|---|---|---|---|
| 1,386,089 | 8/21 | Butzen | 74—440 |
| 1,418,461 | 6/22 | Pierce | 74—440 |
| 1,562,392 | 11/25 | Vincent | 74—242.16 |
| 2,196,479 | 4/40 | Sloan. | |
| 2,393,993 | 2/46 | Knox | 74—242.16 X |
| 2,426,960 | 9/47 | Wesselhoff | 74—242.16 X |

FOREIGN PATENTS 649,859    2/51    Great Britain.

DON A. WAITE, *Primary Examiner.*